(12) United States Patent
Resch et al.

(10) Patent No.: US 6,709,784 B2
(45) Date of Patent: Mar. 23, 2004

(54) BACK-UP BATTERY FOR A CELLULAR TELEPHONE

(75) Inventors: Øivind Resch, Bekkestua (NO); Michael Råberg, Oslo (NO); Tore Lervik, Sellebakk (NO)

(73) Assignee: Jumpit AS, Lysaker (NO)

( * ) Notice: Subject to any disclaimer, the term of this patent is extended or adjusted under 35 U.S.C. 154(b) by 89 days.

(21) Appl. No.: 10/024,027

(22) Filed: Dec. 21, 2001

(65) Prior Publication Data

US 2002/0081487 A1 Jun. 27, 2002

(30) Foreign Application Priority Data

Dec. 22, 2002 (NO) ............................................ 2000 6650

(51) Int. Cl.$^7$ ..................... H01M 10/44; H01M 10/46; H02J 7/00
(52) U.S. Cl. .................. 429/123; 429/99; 429/149; 429/178; 320/103; 320/112; 320/114
(58) Field of Search ................ 429/7, 96, 97, 429/99, 100, 123, 149, 156, 178; 320/103, 112, 114

(56) References Cited

U.S. PATENT DOCUMENTS

| | | |
|---|---|---|
| 3,987,352 A | 10/1976 | Hirota |
| 4,563,626 A | 1/1986 | Ohtake |
| 5,200,688 A | 4/1993 | Patino et al. |
| 5,334,076 A | 8/1994 | Shinozuka |
| 5,396,162 A | 3/1995 | Brilmyer ....................... 320/2 |
| 5,418,433 A | 5/1995 | Nilssen |
| 5,568,038 A | 10/1996 | Tatsumi |
| 5,661,392 A | 8/1997 | Imazeki |
| 5,686,809 A | 11/1997 | Kimura et al. |
| 5,717,308 A | 2/1998 | Nishitani et al. |
| 5,786,106 A | 7/1998 | Armani ....................... 429/98 |
| 5,973,477 A | 10/1999 | Chang |
| 5,977,747 A | 11/1999 | Huang ....................... 320/115 |
| 6,018,231 A | 1/2000 | Shaver et al. |
| 6,043,626 A | 3/2000 | Snyder et al. |
| 6,154,007 A | 11/2000 | Shaver et al. |
| 6,166,519 A | * 12/2000 | Gault ....................... 320/107 |
| 6,184,654 B1 | 2/2001 | Bachner, III et al. |
| 6,268,709 B1 | 7/2001 | Lee et al. |

(List continued on next page.)

FOREIGN PATENT DOCUMENTS

| | | |
|---|---|---|
| EP | 0 437 129 A2 | 7/1991 |
| EP | 0657982 A1 | 6/1995 |
| EP | 0907234 A2 | 4/1999 |
| FR | 2768887 | 3/1999 |
| GB | 2 249 677 A | 5/1992 |
| WO | WO00/69013 | 11/2000 |

OTHER PUBLICATIONS

Wireless Week "We make the Internet Mobile", Lucent Technologies, Dec. 4, 2000.

(List continued on next page.)

*Primary Examiner*—Randy Gulakowski
*Assistant Examiner*—Jonathan Crepeau
(74) *Attorney, Agent, or Firm*—Marshall A. Lerner, Esq.; Bradford E. Mattes, Esq.; Finn T. Simmensen, Esq.

(57) ABSTRACT

The present invention relates to a back-up battery for an electronic device with a rechargeable battery, which electronic device is provided with a contact for connecting a battery charger and which back-up battery consists of one or more battery cells. According to the invention the terminals on the back-up battery are connected to a contact adapted to the contact for the battery charger on the electronic device, with the result that when it is connected to the electronic device's battery charger contact the back-up battery will charge the electronic device's rechargeable battery, thereby providing increased service life for the electronic device.

27 Claims, 1 Drawing Sheet

U.S. PATENT DOCUMENTS

| | | | |
|---|---|---|---|
| 6,288,518 | B1 | 9/2001 | Yang et al. |
| 6,501,246 | B2 | 12/2002 | You et al. |
| 6,526,293 | B1 | 2/2003 | Matsuo |
| 6,528,969 | B2 * | 3/2003 | Tung et al. ................. 320/103 |
| 2002/0053895 | A1 | 5/2002 | Simoes et al. |
| 2002/0067151 | A1 | 6/2002 | Tanishita |
| 2003/0134202 | A1 * | 7/2003 | Chang et al. ............... 429/241 |

OTHER PUBLICATIONS

Elizabeth Mooney "Mitsubishi unveils low –cost challenger to 3G", RCR Wireless News, Dec. 18, 2000.

PC World.com "Make your Cell Phone Live Longer", www.pcworld.com, Nov. 15, 2000.

Alta Vista Search "CC9871 Manual and VF 3540 VF 5720 Accessory for Cellular Phones", www.altavista.com, Jul. 17, 2003.

Radio Shack "Owner's Manual PRO–72, 50–Channel Portable Scanner", Tandy Corporation 1997 Radio Shack, Aug. 5, 1999.

Texas Instruments "UC2906, Lead–Acid Linear Charge Management", Texas Instruments, Inc., Sep. 1996.

Benchmarq Products from Texas Instruments "Programmable Multi–Chemistry Fast–Charge Management IC", Texas Instruments, Inc., Feb. 2001.

* cited by examiner

BACK-UP BATTERY FOR A CELLULAR TELEPHONE

The present invention relates to a back-up battery for an electronic device such as a cellular telephone, a Personal Digital Assistant (PDA), portable PC, camera or any other electronic device with a rechargeable battery being charged through an inboard controller in the electronic device, which electronic device is provided with a contact for connecting a battery charger, and which back-up battery consists of one or more battery cells. According to the invention the terminals on the back-up battery are connected to a contact adapted to the contact for the battery charger on the electronic device, with the result that when it is connected to the electronic device's battery charger contact, the back-up battery will charge the electronic device's rechargeable battery, thereby providing increased service life for the electronic device.

It is an indisputable fact that even though electronic devices are presently supplied with relatively good rechargeable batteries with a long usage time and a long operative waiting time (so-called stand-by time), it is still a common experience to run out of battery capacity. In this case the solution is either to carry a spare battery or to find a suitable place to charge the battery, which in turn depends on having a battery charger available and being in the vicinity of an electric contact point with suitable voltage, etc. In many situations it is impractical to carry a spare battery or charger, in addition to which in many situations it will be necessary to e.g. re-establish the connection via cellular telephone immediately, for example in emergency situations or during important conversations, which are interrupted on account of deficient battery capacity.

To this may be added the fact that at the present time people are in the process of becoming highly dependent on the electronic devices as a communication tool and for personal and business planning and administration. It is therefore important to be able to maintain the necessary preparedness with regard to the electronic device's operative functional time.

Thus it is an object of the back-up battery according to the present invention to provide a solution which gives an electronic device extra battery capacity in a simple manner. It is a further object that the solution should be small, reasonably priced, easy to use and designed in such a manner that a user can employ the back-up battery intuitively.

Amongst previously known solutions, mention may be made of various generally known solutions, which "ration" a part of the battery capacity for an emergency situation. However, this does not cover the need for a general increase in battery capacity when the situation has reached the stage when the user has a depleted battery and still needs an operative electronic device. It is also known to connect an external battery (spare battery) to a suitable device with an electronic circuit, which spare battery gives the electronic device additional operative time through increased battery capacity. The solution is illustrated, amongst other places, in U.S. Pat. No. 5,977,747. The solution will be expensive, involving a connection point and an electronic circuit, which in addition will always have to be available. In the solution in the present invention, the object is to avoid this by providing a universal solution, which employs the electronic device's own control, thus avoiding the need for any extra equipment apart from only the back-up battery, which can then be purchased anywhere and employed immediately.

In U.S. Pat. No. 5,786,106, moreover, a solution is disclosed where different electrical devices such as a torch or the like can be connected to a cellular telephone battery through suitable connection points. In this case it will also be possible to connect the cellular telephone battery to an additional battery in parallel connection. The disadvantage, of course, is that the connected battery has to be specially adapted to the cellular telephone's battery with regard to voltage level, etc., which in turn makes the solution inflexible. Moreover, an electronic control circuit for the connection is preferable.

The present invention relates to a back-up battery for an electronic device with a rechargeable battery, which electronic device is provided with a contact for connecting a battery charger and which electronic device is provided with a control between the electronic device's battery charger contact and the battery, and which back-up battery consists of one or more battery cells. The invention is characterised in that the terminals on the back-up battery are connected to a contact adapted to the contact for the battery charger on the electronic device. Furthermore, the battery voltage between the terminals on the back-up battery is identical to or exceeds the threshold voltage required for the electronic device's control to accept the back-up battery as a charger for the electronic device's own battery. This provides a solution substantially without costly electronic components.

In the preferred embodiment the battery cells and the contact are moulded to form a constructional unit. This is preferred since it provides an easy to handle unit, which can be employed intuitively and reliably according to the object of the present invention.

It has been shown that a great many electronic devices employ a battery with a battery voltage around 3.6 volts, At the same time a standard battery charger often supplies around 9 volts unstable voltage. This voltage is transformed into a suitable charging voltage and the charging is controlled by a control circuit incorporated in the electronic device. This control circuit will only start charging the electronic device's battery if the voltage from the back-up battery is above a predefined lower limit. For most cellular telephones this limit is approximately 3.6 volts. In an embodiment, therefore, the battery voltage between the terminals on the back-up battery is around 3.6 volts (preferably slightly more). In most embodiments this is lower than the voltage from a battery charger, while the voltage is sufficiently high for the control circuit in the electronic device to perceive the back-up battery as a charger and the charging sequence is initiated. The electronic device can be used while this is in progress, and the back-up battery will thereby function "directly" via the charging contact as the electronic device's battery.

In a further alternative embodiment where the control circuit is defined with a higher limit value for voltage into the charging contact in order to implement the charging sequence, the battery voltage between the terminals on the back-up battery is approximately 9 volts. Other voltage levels will, of course, also be suitable and it will be obvious to a person skilled in the art with knowledge of the solution according to the present invention how the battery voltage should be adapted to the solution.

In order to safeguard the battery and particularly the electronic device against undesirable damage, which may occur, e.g., during terminal changing when the battery is depleted, etc., in the preferred embodiment the back-up battery is provided with a diode.

In some embodiments it will be possible to employ a 3.6 volt back-up battery with an electronic device with a battery voltage of approximately 2.4 volts.

The use may be envisaged of a great many different types of the batteries, which are currently available. However, it will be advantageous to employ one or more small battery cells in order that the total back-up battery should be small in size and of the desired shape. Such batteries or battery cells may, for example, be Alcalic, Li-Ion batteries, NiMH, Li/MnO$_2$ or NiCd. The batteries or cells can be connected in parallel or in serial in order to obtain increased capacity or increased voltage respectively between the back-up battery's terminals.

The advantages of the solution according to the present invention are that it will be possible to produce an extremely simple and reasonably priced back-up battery for electronic devices. With the choice of batteries or cells with a voltage level between the terminals according to the invention, the back-up battery will be able to be produced substantially without an electronic control circuit (or only with a diode or limited form of electronics), or other kind of electronic device, since the battery emulates a battery charger, employing the electronic device's own control for the charging sequence. It is possible to combine this with immediate use of most electronic devices since the latter can be used even during the charging sequence. Moreover, the need is eliminated for connecting the battery to more of the electronic device's contact points over and above the charging contact. The use of several contacts is normal in many cases since charging emulators or battery chargers communicate with the electronic device's control circuit for charging through several suitable contact points. Solutions of this kind are, amongst other things, extremely costly since contacts can be expensive. This also makes the back-up battery solution less flexible since in many electronic devices the design of the contacts for the charger is different to that of other peripheral equipment. By only using a charging contact, the number of possible variations of contacts is substantially reduced.

An exemplified embodiment of a solution according to the present invention is further described with reference to the attached figures, in which.

Figure 1:
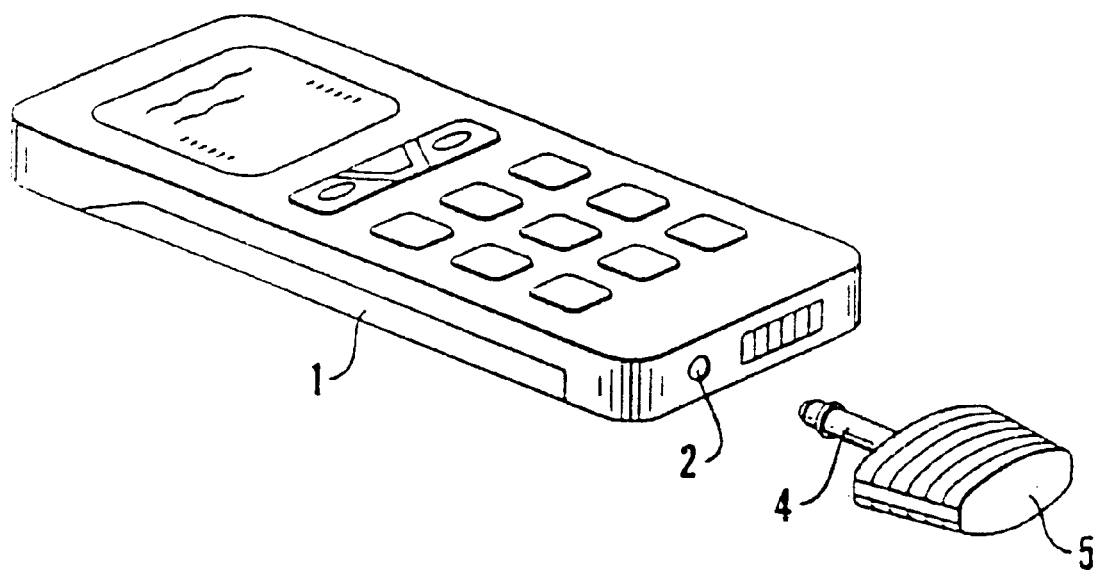
FIG. 1 is a perspective view of a cellular telephone with a back-up battery according to the present invention.

FIG. 1 illustrates a cellular telephone 1 with a rechargeable battery, which cellular telephone 1 has a contact 2 for connecting a battery charger. In connection with the contact 2 the cellular telephone 1 is equipped with a control circuit (not shown) for charging the cellular telephone's 1 battery.

Figure 2:
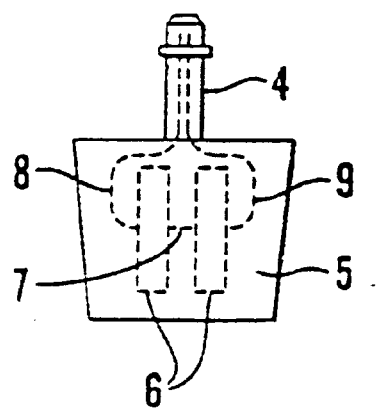
FIG. 2 is an open plan view showing the back-up battery illustrated in FIG. 1.

The back-up battery as illustrated in FIG. 1 consists of a battery body 5 containing one or more batteries or cells (illustrated in FIG. 2). The plug 4 is further connected to the terminals on the battery, the batteries, the cell or cells in the back-up battery 5.

The batteries or cells are further illustrated in FIG. 2, where two batteries or cells 6 are connected in series with the wired connection 7 and the back-up battery's 5 terminals are connected via the wired connections 8 and 9 with the contact 4, which in turn is adapted to the charging contact 2 in the cellular telephone. The voltage between the terminals may, for example, be approximately 3.6 volts in cases where the control in the cellular telephone 1 has a defined threshold value around 3.6 volts or lower for initiating the charging sequence of the cellular telephone's battery. In cases where the threshold value is higher, one or more other cells or batteries 6 may be employed in the back-up battery 5, where the battery voltage between the back-up battery's terminals corresponds to or exceeds this threshold value, thus initiating the charging sequence.

What is claimed is:

1. A back-up battery device for an electronic device with a rechargeable battery, which electronic device is provided with a contact for connecting a battery charger and which electronic device is provided with an inboard controller between the electronic device's contact for the battery charger and the rechargeable battery,
   which back-up battery device comprises one or more battery cells, electrically connected to a plug in the back-up battery device, wherein said plug is adapted to be connected to said contact of said electronic device
   and the back-up battery device has a voltage that is identical to or exceeds the threshold voltage required for the electronic device's inboard controller to accept the back-up battery device as a charger for the electronic device's rechargeable battery.

2. A back-up battery device according to claim 1, wherein the one or more battery cells are permanently encased in the back-up battery device.

3. A back-up battery device according to claim 1, wherein the voltage of the back-up battery device is approximately 3.6 volts.

4. A back-up battery device according to claim 1, wherein the voltage of the back-up battery device is approximately 9 volts.

5. A back-up battery device according to claim 1, wherein a diode is electrically connected between the one or more battery cells and the plug in the back-up battery device.

6. Device comprising an electronic device with a rechargeable battery which electronic device is provided with a contact for connecting a battery charger and an electronic control circuit connected between the electronic device's contact for the battery charger and the rechargeable battery, which control circuit controls the charging of the rechargeable battery when supplied through the contact with a current at a voltage above a predefined threshold voltage,
   characterized in that the device comprises a back-up battery device with a plug compatible with the contact for the battery charger in the electronic device and that the back-up battery device comprises one or more battery cells which are electrically connected to the plug and that
   the back-up battery device when connected to the electronic device supplies the electronic circuit with a current at a voltage which is identical to or exceeds the threshold voltage required by the electronic device's electronic control circuit.

7. A device according to claim 6, wherein the one or more battery cells are permanently encased in the back-up battery device.

8. A device according to claim 6, wherein the voltage in the one or more battery cells inside the device is approximately 3.6 volts.

9. A device according to claim 7, wherein the voltage in the one or more battery cells inside the device is approximately 3.6 volts.

10. A device according to claim 6, wherein the voltage in the one or more battery cells inside the device is approximately 9 volts.

11. A device according to claim 7, wherein the voltage in the one or more battery cells inside the device is approximately 9 volts.

12. A device according to claim 6, wherein a diode is electrically connected between the one or more battery cells and the plug in the device.

13. A device according to claim 7, wherein a diode is electrically connected between the one or more battery cells and the plug in the device.

14. A device according to claim 8, wherein a diode is electrically connected between the one or more battery cells and the plug in the device.

15. A device according to claim 9, wherein a diode is electrically connected between the one or more battery cells and the plug in the device.

16. A device according to claim 10, wherein a diode is electrically connected between the one or more battery cells and the plug in the device.

17. A device according to claim 11, wherein a diode is electrically connected between the one or more battery cells and the plug in the device.

18. A back-up battery device according to claim 2, wherein the voltage of the back-up battery device is approximately 3.6 volts.

19. A back-up battery device according to claim 2, wherein the voltage of the back-up battery device is approximately 9 volts.

20. A back-up battery device according to claim 2, wherein a diode is electrically connected between the one or more battery cells and the plug in the back-up battery device.

21. A back-up battery device according to claim 3, wherein a diode is electrically connected between the one or more battery cells and the plug in the back-up battery device.

22. A back-up battery device according to claim 4, wherein a diode is electrically connected between the one or more battery cells and the plug in the back-up battery device.

23. A back-up battery device according to claim 18, wherein a diode is electrically connected between the one or more battery cells and the plug in the back-up battery device.

24. A back-up battery device according to claim 19, wherein a diode is electrically connected between the one or more battery cells and the plug in the back-up battery device.

25. A back-up battery device comprising:

one or more cells electrically connected to a plug wherein the plug is adapted to fit a charging contact of an electronic device and the charging contact is connected to an inboard charge controller and the inboard charge controller is connected to a rechargeable battery in the electronic device, and wherein a voltage level is produced by the one or more cells that is sufficiently high so as to invoke charging through the inboard charge controller.

26. A back-up battery device according to claim 25 wherein the one or more cells are connected to a diode and the diode is connected to the plug.

27. A method for using a back-up battery device to recharge a rechargeable battery in an electronic device wherein:

the back-up battery device comprises:
one or more cells electrically connected to
a plug wherein the plug is adapted to fit a charging contact of the electronic device, and
a voltage level produced by the one or more cells that is sufficiently high so as to invoke charging of the rechargeable battery;

the electronic device comprises:
a charging contact connected to
an inboard charge controller and the inboard charge controller is connected to
a rechargeable battery in the electronic device; wherein charging is begun by connecting the plug to the charging contact.

* * * * *

UNITED STATES PATENT AND TRADEMARK OFFICE
CERTIFICATE OF CORRECTION

PATENT NO. : 6,709,784 B2
DATED : March 23, 2004
INVENTOR(S) : Resch et al.

It is certified that error appears in the above-identified patent and that said Letters Patent is hereby corrected as shown below:

<u>Title page,</u>
Item [30], Foreign Application Priority Data, delete
"Dec. 22, 2002   (NO)..................2000 6650," and replace with:
-- Dec. 22, 2000   (NO)..................2000 6650 --

Signed and Sealed this

Twenty-fourth Day of August, 2004

JON W. DUDAS
*Director of the United States Patent and Trademark Office*